US011328829B2

(12) United States Patent
Cheiney et al.

(10) Patent No.: US 11,328,829 B2
(45) Date of Patent: May 10, 2022

(54) TWO-DIMENSIONAL DIFFRACTION GRATING ATOMIC INTERFEROMETER AND ATOMIC INTERFEROMETRY METHOD

(71) Applicant: IXBLUE, Saint-Germain-en-Laye (FR)

(72) Inventors: Pierrick Cheiney, Saint-Germain-en-Laye (FR); Baptiste Gouraud, Saint-Germain-en-Laye (FR); David Brynle Barrett, Talence (FR); Baptiste Battelier, Talence (FR); Philippe Bouyer, Talence (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 17/227,023

(22) Filed: Apr. 9, 2021

(65) Prior Publication Data

US 2021/0319925 A1 Oct. 14, 2021

(30) Foreign Application Priority Data

Apr. 10, 2020 (FR) ...................................... 2003648

(51) Int. Cl.
*G21K 1/00* (2006.01)
*G01P 15/093* (2006.01)
(Continued)

(52) U.S. Cl.
CPC ............ *G21K 1/006* (2013.01); *G01P 15/093* (2013.01); *G02B 5/18* (2013.01); *G02B 27/28* (2013.01)

(58) Field of Classification Search
CPC ............................. G21K 1/006; G01P 15/093
See application file for complete search history.

(56) References Cited

U.S. PATENT DOCUMENTS 4,874,942 A * 10/1989 Clauser ................... G01P 15/08
250/251
8,373,112 B2 * 2/2013 Bouyer ................... G01C 19/58
250/251
(Continued)

FOREIGN PATENT DOCUMENTS

FR 2 928 725 9/2009

OTHER PUBLICATIONS

Bodart, Quentin, et al. "A cold atom pyramidal gravimeter with a single laser beam." Applied Physics Letters 96.13 (2010): 134101. (Year: 2010).*

(Continued)

*Primary Examiner* — Wyatt A Stoffa
(74) *Attorney, Agent, or Firm* — Nixon & Vanderhye

(57) ABSTRACT

Disclosed is an atomic interferometer including a source of atoms, a laser source and a magnetic field generating device, a polarizer, a system for adjusting a detuning between two optical frequencies of the incident laser beam, a two-dimensional diffraction grating arranged in such a way as to receive the incident laser beam and to form by diffraction at least three diffracted beams, a controller configured to select a combination of an optical frequency detuning, a polarization state and a magnetic field, the combination being adapted to select a first pair of laser beams among the pairs of beams formed from the incident laser beam and the diffracted beams, the pair of laser beams being applied in such a way as to interact with the cloud of atoms by multi-photon transitions and to detect an acceleration of the cloud of atoms along a measurement direction.

19 Claims, 3 Drawing Sheets

(51) Int. Cl.
  *G02B 5/18*     (2006.01)
  *G02B 27/28*    (2006.01)

(56) References Cited

U.S. PATENT DOCUMENTS

| | | | | |
|---|---|---|---|---|
| 10,278,275 | B2* | 4/2019 | Imhof | G21K 1/006 |
| 10,531,554 | B2* | 1/2020 | Imhof | G02B 27/4233 |
| 2011/0073753 | A1* | 3/2011 | Bouyer | G01P 15/006 |
| | | | | 250/251 |
| 2017/0370840 | A1* | 12/2017 | Sinclair | G01N 21/6404 |
| 2021/0375499 | A1* | 12/2021 | Marchand | G06N 10/00 |

OTHER PUBLICATIONS

Wu, Xuejian, et al. "Multiaxis atom interferometry with a single-diode laser and a pyramidal magneto-optical trap." Optica 4.12 (2017): 1545-1551. (Year: 2017).*
Li et al., A Multi-Axis Atom Interferometer Gyroscope Based on a Grating Chip, 2020 IEEE International Symposium on Inertial Sensors and Systems (Inertial), Mar. 23, 2020, XP033770284, pp. 1-4 (4 total pages).
Nshii et al., "A surface-patterned chip as a strong source of ultra-cold atoms for quantum technologies", Nature Nanotechnology, Jan. 1, 2013, vol. 8, pp. 231-324 (5 total pages).
Canuel et al., "6-axis inertial sensor using cold-atom interferometry", arxiv.org, Apr. 7, 2006, XP080235504, 5 pages.
Xue et al., "A continuous cold atomic beam interferometer", Journal of Applied Physics, Mar. 7, 2015, vol. 117, No. 9, 6 pages.
Barrett et al., "The Sagnac effect: 20 years of development in matter-wave interferometry", Comptes Rendus Physique, 2014, vol. 15, pp. 875-883 (9 pages).
French Search Report for FR 2003648 dated Nov. 27, 2020, 3 pages.

\* cited by examiner

TWO-DIMENSIONAL DIFFRACTION GRATING ATOMIC INTERFEROMETER AND ATOMIC INTERFEROMETRY METHOD

CROSS-REFERENCE TO RELATED APPLICATIONS

This application claims priority to FR 2003648 filed Apr. 10, 2020, the entire content of which is hereby incorporated by reference.

TECHNICAL FIELD

The present invention relates to the technical field of atomic interferometers, in particular for acceleration and/or rotation measurements.

It more particularly relates to an inertial sensor based on a Mach-Zehnder atomic interferometer for acceleration and/or rotation measurements along a predetermined and configurable direction. It also relates to an inertial sensor based on an atomic interferometer for sequential acceleration and/or rotation measurements along several axes.

PRIOR ART

The making of a light-pulse cold-atom interferometer is based on the interactions between one or several laser sources and atoms in a space under ultra-vacuum. The laser source is generally configured to successively fulfil different functions detailed hereinafter.

The following steps more specifically relate to the making of a light-pulse Mach-Zehnder atomic interferometer in which at least three pairs of laser beams, separated in time and/or in space, fulfil the functions of separating plates and mirrors for the atoms, by interaction with the hyperfine structure of the atoms. Each pair of beams comprises two counter-propagating beams. In the case of an accelerometer, the counter-propagating beams are generally arranged parallel to the direction of propagation of the atoms. In the case of a gyrometer, the counter-propagating beams are generally arranged transverse to the direction of propagation of the atoms. The last step consists in detecting the atom-wave interference state at the interferometer exit, for example by laser fluorescence on an absorption line of the atoms, and in counting the total number of atoms in order to normalize the interferometric measurements.

These steps form an atomic interferometry measurement sequence whose total duration is generally lower than one second.

Most of the atomic interferometers use two-photon Raman transitions to split, reflect and recombine atomic wave packets in order to form an interferometer, for example a Mach-Zehnder interferometer, sensitive to different inertial effects. In order to obtain a sensitivity to the inertial effects, it is necessary to use two laser beams with two different optical frequencies propagating in opposite directions. In the case of the Mach-Zehnder configuration, the interferometer is sensitive to the acceleration of the atoms along a measurement direction defined by the optical wavevector resulting from the difference between the wavevectors of the two laser beams used.

The most typical beam configuration consists in an incident laser beam containing two different frequencies whose frequency detuning corresponds to the hyperfine structure of the atom, reflected on a planar mirror. In this case, the two-photon Raman transition involves the incident beam and the beam reflected by the planar mirror. The Mach-Zehnder atomic interferometer is sensitive to the acceleration of the atoms along a direction orthogonal to the mirror plane.

It is advantageous to use a source of cold atoms in order to increase the sensitivity of the atomic interferometer. Obtaining a source of cold atoms requires a trapping and cooling step based for example on a magneto-optic trap that requires the use of laser beams along at least four directions in space.

In this case, the measurement method includes the following steps that are preliminary to the atomic interferometry itself. A first step is a step of atom trapping, which consists in maintaining the position of the cloud of atoms, and of atom cooling, which consists in reducing the extent of speed dispersion of the atoms by mechanisms of photon absorption in a magneto-optic trap. A second, launching step consists in interrupting the trapping and in letting the atoms fall under the effect of gravity or in imparting them an initial speed, for example by interaction with another laser beam or with a magnetic field gradient.

In order to simplify the trapping system permitting the atom cooling and to make it more compact, a first known approach is based on the use of a conical or pyramidal reflector. Such a reflector makes it possible to use only one incident laser beam during the laser cooling step. The conical or pyramidal reflector reflects the incident beam along different directions. In the case of a pyramidal reflector with four facets inclined by 45 degrees with respect to the axis of incident beam, the incident laser beam has a sufficient spatial extent to form two pairs of reflected beam, each pair comprising two counter-propagating beams, oriented orthogonally with respect to the incident laser beam. The incident beam is also reflected to itself by successive reflexions on two faces of the pyramid. Such a pyramidal reflector forms a trap by superposition of the incident laser beam, of the four reflected beams perpendicular to the incident beam and of beam(s) back-reflected by double reflection on two opposite faces of the pyramid. The pyramidal reflector can further include a fifth face transverse to the incident laser beam. In this case, the back-reflected beam, which is counter-propagating with respect to the incident laser beam, comes from a simple reflection on this fifth face. Advantageously, in a four- or five-facet pyramidal reflector, a single incident laser beam is reflected on the different faces of a hollow pyramid, in such a way as to create three pairs of counter-propagating beams propagating in superposed orthogonal directions in a region of space. Such a pyramidal reflector hence forms a trap by superposition of three pairs of beams oriented along three orthogonal axes. The patent FR 2928725 (P. Bouyer et A. Landragin) describes the use of a conical or pyramidal reflector in a cold-atom interferometric sensor, wherein the conical or pyramidal reflector is used to produce a pair of laser beams consisted of the incident laser beam and a counter-propagating beam obtained by double reflection on the conical or pyramidal reflector, this pair of laser beams being adapted to form an atomic interferometer sensitive to an acceleration along the direction of the incident beam. In this configuration, the atoms are initially trapped and cooled in the area of superposition of the six beams. A time of free fall is then introduced, during which the atoms fall out of the area of superposition of the six beams. The interferometric sequence is then applied and involves the incident beam and the back-reflected beam obtained by double reflection.

More recently, another trap approach has been developed, which is based on a two-dimensional diffraction grating combined with a single incident laser beam. It is meant herein by "two-dimensional diffraction grating" a diffraction grating having a periodic pattern along at least two transverse directions. The publication C. C. Nshii et al. ("A surface-patterned chip as a strong source of ultracold atoms for quantum technologies", Nature Nanotechnology, Vol. 8, pages 321-324, 2013) discloses a two-dimensional diffraction grating consisted of three linear gratings, which is operable to diffract an incident beam into three diffracted beams that are spatially superposed to the incident beam to form a four-beam magneto-optic trap (MOT), the three diffracted beams being inclined by an angle θ with respect to the incident beam. The C. C. Nshii et al. Publication also discloses another two-dimensional diffraction grating having the same pattern and the same pitch along two orthogonal directions, which allows diffracting an incident beam into four diffracted beams that are superposed to the incident beam to form a five-laser beam magneto-optic trap, the four diffracted beams being inclined by an angle θ with respect to the incident beam.

Until now, these two-dimensional diffraction gratings have been used only for the atomic trapping and cooling phase. It is hence necessary to use other pairs of laser beams, independently of the two-dimensional diffraction grating trapping device, to form a Mach-Zehnder atomic interferometer.

The technical problem that is proposed to be solved by the present invention is to provide a compact atomic interferometer, the atomic interferometer being sensitive along a direction that is selectable among a set of predeterminedly adjusted directions.

DISCLOSURE OF THE INVENTION

For that purpose, the invention proposes an atomic interferometer comprising a source of atoms adapted to generate a cloud of atoms, a magnetic field generating device and a laser source configured to generate a source laser beam.

According to the invention, the atomic interferometer includes polarization means configured to receive the source laser beam and to generate an incident laser beam, polarized according to an adjustable polarization state, a system for adjusting a detuning between two optical frequencies of the incident laser beam, a two-dimensional diffraction grating arranged is such a way as to receive the incident laser beam and to form by diffraction at least three beams diffracted along at least three non-coplanar directions, the at least three diffracted beams being inclined with respect to the axis of the incident laser beam, a controller configured to select a first combination of a first optical frequency detuning of the incident laser beam related to a first speed of the cloud of atoms, a first polarization state of the incident laser beam and a first magnetic field oriented along a determined direction with respect to the two-dimensional diffraction grating, the combination being adapted to select a first pair of laser beams among the pairs of laser beams formed from the incident laser beam and the at least three diffracted beams, a difference between the two wavevectors of the first pair of laser beams determining a first measurement direction, the first pair of laser beams being applied in such a way as to interact with the cloud of atoms according to a time sequence by multi-photon transitions and to form a first Mach-Zehnder atomic interferometer sensitive to an acceleration of the cloud of atoms along the first measurement direction.

Hence, the set of predeterminedly adjusted directions is linked to the geometry of the two-dimensional diffraction grating. More precisely, the orientation and the configuration of the two-dimensional diffraction grating determine a three-dimensional non-orthogonal basis making it possible to obtain atomic interferometry measurements along three axes of this 3D basis. More precisely, the invention makes it possible to chose, for each measurement, the sensitive direction of the atomic interferometer among a finite set of predetermined directions.

According to a particular and advantageous aspect, the controller is configured to select a second combination of a second optical frequency detuning of the incident laser beam related to a second speed of the cloud of atoms, a second polarization state of the incident laser beam and a second magnetic field with respect to the two-dimensional diffraction grating, the second combination being adapted to select a second pair of laser beams among the pairs of laser beams formed from the incident laser beam and the at least three diffracted beams, a difference between the two wavevectors of the second pair of laser beams determining a second measurement direction different from the first measurement direction, the second pair of laser beams being applied in such a way as to interact with the cloud of atoms according to a time sequence by multi-photon transitions and to form a second Mach-Zehnder atomic interferometer sensitive to an acceleration of the cloud of atoms along the second measurement direction.

In an embodiment, the two-dimensional diffraction grating is a diffraction grating configured to generate by diffraction four beams diffracted in four non-coplanar directions.

In another embodiment, the two-dimensional diffraction grating is a diffraction grating configured to generate by diffraction three beams diffracted in three non-coplanar directions.

Advantageously, the two-dimensional diffraction grating is of the polarization-maintaining type.

According to particular and advantageous aspects, the polarization means comprise a liquid crystal retarder, a Pockels cell or a polarization controller based on the deformation of a single-mode optical fibre.

According to other particular and advantageous aspects, the magnetic field generating device includes three pairs of electric coils in Helmholtz configuration.

According to a particular and advantageous aspect, the atomic interferometer comprises magnetic field gradient generating means adapted to adjust the first speed and/or the second speed of the cloud of atoms.

Advantageously, the system for adjusting a detuning between two optical frequencies of the incident laser beam is adapted to adjust the first optical frequency detuning as a function of the first speed of the cloud of atoms and/or, respectively, to adjust the second optical frequency detuning as a function of the second speed of the cloud of atoms.

In an embodiment, the system for adjusting a detuning between two optical frequencies of the incident laser beam comprises an electro-optic modulator or a radiofrequency source.

According to another particular aspect, the atomic interferometer comprises means for orienting the two-dimensional diffraction grating.

The invention also relates to an atomic interferometry method comprising the following steps: a) generating a cloud of atoms; b) selecting a first polarization state of a laser beam incident on a two-dimensional diffraction grating and a first magnetic field oriented along a determined direction with respect to the two-dimensional diffraction grating; c) launching the cloud of atoms with a first speed and calculating a first detuning between two optical frequencies of the incident laser beam, the first optical frequency detuning being related to the first speed, to form a first combination of the first optical frequency detuning of the incident laser beam, the first polarization state of the incident laser beam and the first magnetic field, the first combination being adapted to select a first pair of beams among the pairs of beams formed from the incident laser beam and at least three diffracted beams formed by diffraction of the incident laser beam on the two-dimensional diffraction grating along at least three non-coplanar directions; d) applying to the cloud of atoms the first combination of the first magnetic field, the first polarization state and the first detuning between two optical frequencies of the incident laser beam, in such a way as to select the first pair of laser beams, a difference between wavevectors of the first pair of laser beams determining a first measurement direction, the first pair of laser beams being applied in such a way as to interact with the cloud of atoms according to a time sequence of multi-photon transitions and to form a first Mach-Zehnder atomic interferometer sensitive to an acceleration of the cloud of atoms along the first measurement direction; and e) detecting a signal representative of an acceleration of the cloud of atoms along the first measurement direction.

Advantageously, step a) is repeated and the atomic interferometry method further comprises the following steps: f) selecting a second magnetic field and a second polarization state of the laser beam incident on the two-dimensional diffraction grating; g) launching the cloud of atoms with a second speed and calculating a second detuning between two optical frequencies of the incident laser beam, the second optical frequency detuning being related to the second speed, to form a second combination of the second optical frequency detuning of the incident laser beam, the second polarization state of the incident laser beam and the second magnetic field, the second combination being adapted to select a second pair of beams among the pairs of beams formed from the incident laser beam and the at least three diffracted beams; h) applying to the cloud of atoms the second combination of the second magnetic field, the second polarization state and the second detuning between two optical frequencies of the incident laser beam, in such a way as to select the second pair of laser beams, a difference between wavevectors of the second pair of laser beams determining a second measurement direction, the second pair of laser beams being applied in such a way as to interact with the cloud of atoms according to a time sequence of multi-photon transitions and to form a second Mach-Zehnder atomic interferometer sensitive to an acceleration of the cloud of atoms along the second measurement direction; i) detecting a signal representative of an acceleration of the cloud of atoms along the second measurement direction.

According to a particular aspect, the atomic interferometry method comprises a step of trapping and cooling the cloud of atoms to form a cloud of cold atoms and preparing an initial quantum state of the cloud of cold atoms.

Advantageously, the trapping and cooling step comprises a magneto-optic trapping of the cloud of atoms by superposition of the incident laser beam and the at least three diffracted beams in an overlapping area and by application of a quadripolar magnetic field adapted to form the cloud of cold atoms.

Of course, the different features, variants and embodiments of the invention can be associated with each other according to various combinations, insofar as they are not incompatible with each other or exclusive from each other.

BRIEF DESCRIPTION OF THE FIGURES

Moreover, various other features of the invention emerge from the appended description made with reference to the drawings that illustrate non-limitative embodiments of the invention and in which.

It is to be noted that, on these figures, the structural and/or functional elements common to the different variants can be denoted by the same references.

DETAILED DESCRIPTION

Figure 1:
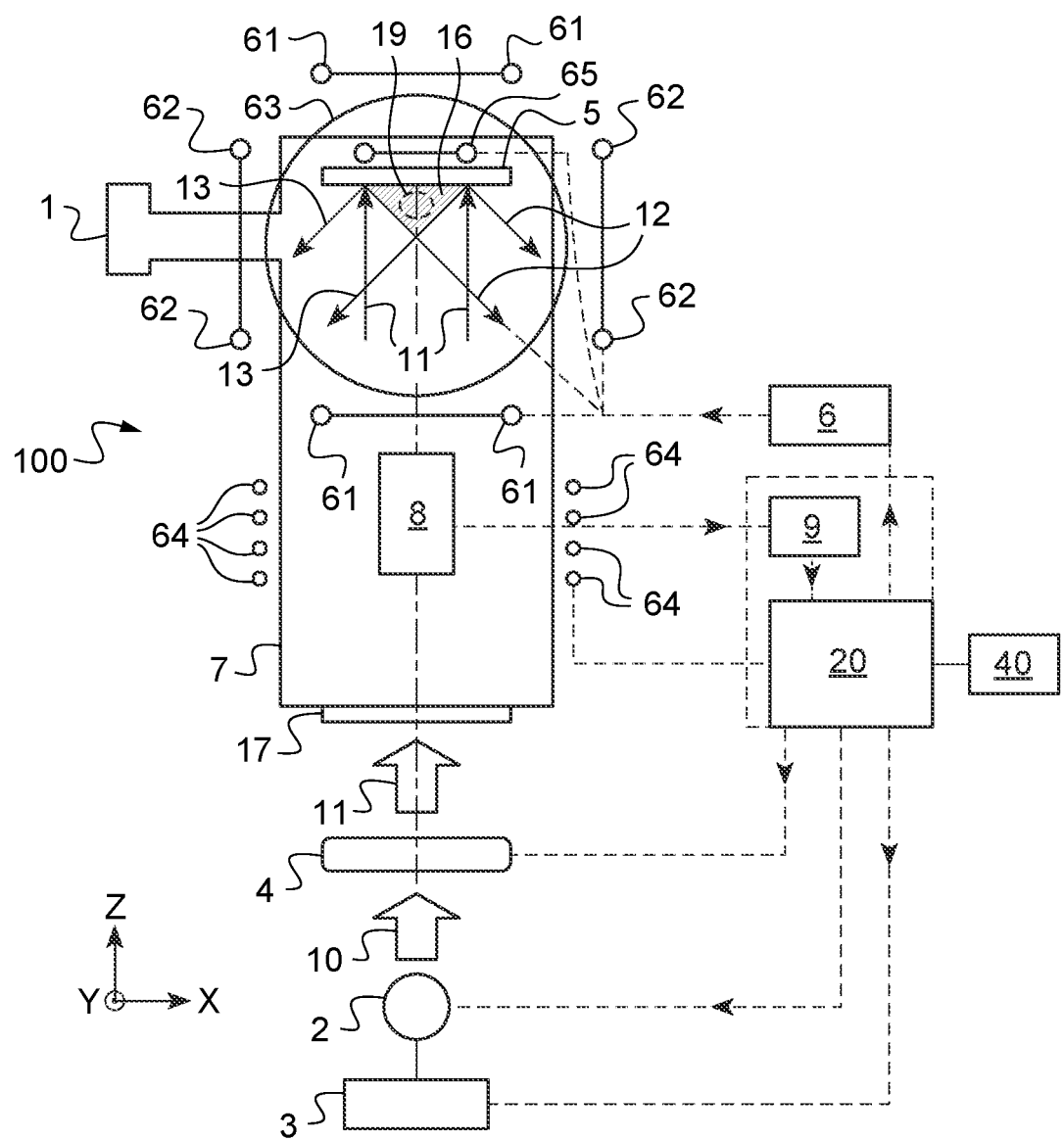
FIG. 1 is a schematic cross-sectional view of an atomic interferometer according to an embodiment of the invention.

FIG. 1 schematically shows an atomic interferometer adjustable to perform an atomic interferometry measurement with respect to a determined axis or to sequentially perform several atomic interferometry measurements along several adjustable axes. An orthonormal XYZ coordinate system is represented, with the plane of FIG. 1 being in the XZ-plane.

The atomic interferometer 100 includes a vacuum chamber 7 provided with a window 17, a source of atoms 1, a laser source 2 adapted to generate a source laser beam 100, a system 3 for adjusting an optical frequency detuning between two lines of the laser source, means 4 for polarizing the source laser beam, a two-dimensional diffraction grating 5, a magnetic field generating device comprising for example three pairs of electric coils in Helmholtz configuration 61, 62, 63 arranged in such a way as to generate a magnetic field of adjustable direction, a detection system 8, a calculator 9, a controller 20 and a user interface (or IHM) 40.

The source of atoms 1 comprises for example a tank containing a source material in solid form and means for vacuum evaporation of the source material atoms. The source of atoms 1 is a source of alkaline atoms such as caesium (Cs), lithium (Li), rubidium (Rb) and/or potassium (K) atoms. The source of atoms generates for example rubidium-87 atoms, which are transferred to the vacuum chamber 7.

The laser source 2 includes a two-frequency laser (also called bi-frequency laser) or two lasers having slightly different optical frequencies. The laser source 2 emits a source beam 10 having two optical frequencies separated by a frequency detuning (denoted δ) that is adjustable via the adjustment system 3 during the atomic interferometry method.

In a Mach-Zehnder atomic interferometer, the source beam 10 comprises a series of light pulses intended to interact with the atoms by a series of multi-photon transitions.

Different transition processes implementing at least two photons are currently used in the cold-atom interferometer systems. Some transition processes are based on two-photon Raman or Bragg transitions or on multi-photon Raman or Bragg transitions or also Bloch oscillations. By way of example, we consider here a configuration based on two-photon Raman transitions.

The light-pulse atomic interferometers sensitive to the inertial effects are based on two-photon transitions that are speed-selective or, in other words, optical frequency detuning-selective, the transition being resonant for an optical frequency f linked to the speed v of the atoms by Doppler effect according to the formula: f=k.v. A common example of this type of two-photon transition corresponds to a Raman transition, where two laser beams of optical frequencies ω1 and ω2 are adjusted in the vicinity of an optical transition in the considered atom, while being detuned enough so that the level of excited population is sparsely populated. The optical frequency detuning δ=(ω1−ω2) is chosen so as to be resonant with a radiofrequency transition between two hyperfine fundamental levels of the considered atom. A Bragg multi-photon or Bloch oscillation transition may also be used to construct an atomic interferometer. In the last mentioned cases, instead of producing transitions between two hyperfine fundamental levels, the atoms stay in the same fundamental state and only their momentum changes. In the following of the description, the case of multi-photon transitions of the two-photon Raman transition type for atoms of rubidium 87 ($^{87}$Ru) will be taken as an example. However, the principle also applies to other multi-photon transitions, for example Bragg or Bloch transitions. The same principle also applies to other atoms, for example lithium, sodium, potassium or caesium atoms.

The laser source 2 is connected to a system 3 for adjusting an optical frequency detuning between two lines of the laser source, which makes it possible to successively and very accurately adjust the optical frequency of the laser source 2 as a function of the different energy transitions used about a transition wavelength characteristic of the considered atomic species. The system 3 for adjusting the optical frequency detuning (δ) comprises, for example, a radiofrequency (RF) source adapted to modulate the optical frequency of a laser or the optical frequency detuning between two lasers.

Such a laser source system can be adapted to generate a single laser line or two simultaneous laser lines, wherein the optical frequency of each of these laser lines switches several times during an atomic interferometry sequence in a spectrum range of generally a few gigahertz (GHz) around the transition optical frequency. Each switch is applied for a duration between a few microseconds and a few hundreds of milliseconds. For the different laser pulses constituting the interferometer itself (separating plates and mirrors), the two frequencies are phase-coherent. This coherence can be obtained for example by phase-locking two independent lasers or by modulating a single laser. The adjustment system 3 makes it possible to rapidly and very accurately tune and switch the optical frequency(ies) of the laser source 2. More precisely, the laser source is optical frequency switchable and tunable in the THz domain, to produce a detuning of the laser beam optical frequency, this detuning having a maximum amplitude of a few tens of GHz or, in other words, a very fine wavelength adjustment of at most about ten picometres with respect to a predetermined wavelength. For example, the target wavelength is 852.34 nm for cesium, 780.24 nm for rubidium and 767 nm for potassium.

The adjustment system 3 comprises for example an electro-optic modulator that modulates the frequency of the laser source by means of signals at microwave carrier frequencies to generate a sequence of predetermined optical frequencies. In this case, the two optical frequencies are phase-coherent. Another possible implementation consists in using two lasers that are phase-locked thanks to a phase-locked loop.

Each optical frequency switch corresponds to a wavelength value change very accurately determined as a function of the absorption spectrum of the atomic species used. On the other hand, the light power generated on each line must be very accurately controlled. Moreover, in atomic interferometry, the relative phase between the two optical frequencies must be perfectly controlled. Finally, the spectral width of the source laser must keep its very high fineness for the whole duration of the process.

The laser source 2 generates a source laser beam 10 propagating along the Z-axis of the orthonormal coordinate system.

Polarization means 4 are arranged between the laser source 2 and the window 17 of the vacuum chamber 7. The polarization means 4 comprise for example a liquid crystal retarder, a Pockels cell or a polarization controller based on the deformation of a single-mode optical fibre. The polarization means 4 receive the source laser beam 10 and form an incident laser beam 11 that is polarized. The polarization means 4 are configured to adjust on demand the polarization of the incident laser beam 11. For example, the polarization means 4 make it possible to adjust the polarization state of the incident laser beam 11 according to either a linear polarization state in the XY-plane or a right or left circular polarization state.

The incident laser beam 11 propagates along the Z-axis towards the window 17 of the vacuum chamber 7.

The two-dimensional diffraction grating 5 is placed in the vacuum chamber 7. The normal to the two-dimensional diffraction grating 5 is merged with the Z-axis direction. In this configuration, the incident laser beam 11 is orthogonal to the two-dimensional diffraction grating 5. The two-dimensional diffraction grating 5 receives the incident laser beam 11 and forms by diffraction diffracted beams.

In the example illustrated in FIGS. 2 to 5, the two-dimensional diffraction grating 5 is a diffraction grating having a same periodic pattern and a same spatial period along two orthogonal directions, here oriented along the X and Y axes, respectively. Such a two-dimensional diffraction grating 5 is operable to diffract an incident beam into four diffracted beams, for example in orders +1 and −1 in two transverse diffraction planes. The diffracted beams are not colinear two-by-two or in combination with the incident laser beam. The four diffracted beams are not coplanar.

Figure 2:
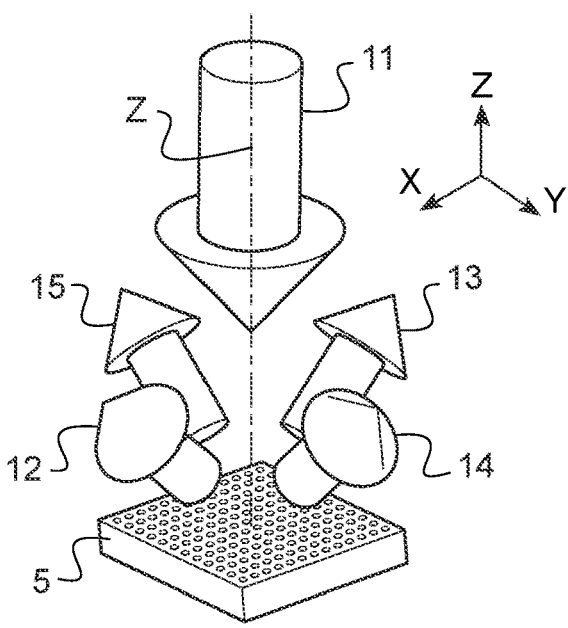
FIG. 2 is a perspective view of the geometry of the laser beams incident and diffracted on a particular two-dimensional diffraction grating to form an atomic interferometer according to an embodiment of the invention.
Figure 3:
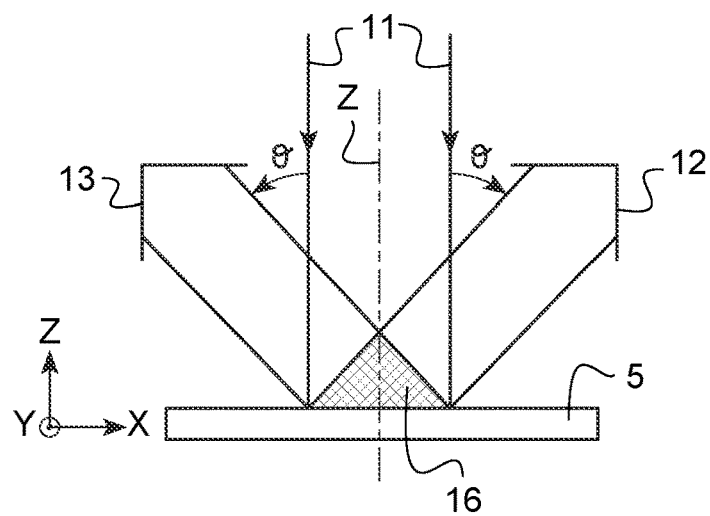
FIG. 3 is a view in a plane of diffraction transverse to the two-dimensional diffraction grating of FIG. 2, which illustrates the overlapping of the incident beam and of two diffracted beams.

More precisely, FIG. 2 is a perspective view of the incident laser beam 11 and the diffracted beams 12, 13, 14, 15 and FIG. 3 is a cross-sectional view in the XZ-plane of the incident laser beam 11 and of two diffracted beams 12, 13. The two-dimensional diffraction grating 5 is here advantageously configured so that there is not zero-order diffraction (i.e. in counter-propagation with respect to the incident laser beam 11). The suppression of the zero-order diffraction is obtained for example by adjusting the pattern of the grating 5 and, in particular, the depth thereof. However, the suppression of the zero-order diffraction is not essential within the framework of the present invention. In FIGS. 2 and 3, it is observed that the four diffracted beams 12, 13, 14, 15 are located in two diffraction planes. More precisely, a first diffracted beam 12 is +1-order diffracted in the XZ-plane, a second diffracted beam 13 is −1-order diffracted in the XZ-plane, a third diffracted beam 14 is +1-order diffracted in the YZ-plane, and a fourth diffracted beam 15 is −1-order diffracted of the YZ-plane. Each of the diffracted beams forms an angle θ with the direction of the incident laser beam 11, in other word the Z-axis. The angle θ is between 30 degrees and 60 degrees, for example about 45 degrees. The diffracted beams 12, 13, 14, 15 are hence not orthogonal to the incident laser beam 11, contrary to the reflected laser beams typically used in an atomic interferometry system based on a conical or pyramidal reflector or on a planar reflector.

Other geometries of two-dimensional diffraction grating are conceivable. In particular, the diffraction planes are not necessarily orthogonal to each other but may form an angle different from 90 degrees. This may be obtained using a two-dimensional diffraction grating having a periodic pattern along two directions forming an angle different from 90 degrees between each other.

On the other hand, the diffraction angles may be different in different diffraction planes. This may be obtained using a two-dimensional diffraction grating having at least two different grating pitches along two distinct directions.

More generally, it is also possible to use a diffraction grating having suitable geometry and symmetry to form three beams diffracted in three distinct diffraction planes, the three diffracted beams being not coplanar.

Particularly advantageously, the two-dimensional diffraction grating 5 is a polarization-maintaining diffraction grating. In other words, the diffracted beams 12, 13, 14, 15 have the same polarization state as the incident laser beam 11.

The incident laser beam 11 and the four diffracted beams 12, 13, 14, 15 are superposed to each other in an overlapping area 16, also called trapping area. The overlapping area 16 here has a pyramidal shape whose square base is on the two-dimensional diffraction grating 5. In the trapping and cooling step, the superposition of the incident laser beam 11 and the four diffracted beams 12, 13, 14, 15 allows confining the cloud of atoms coming from the source of atoms in the vicinity of the surface of the two-dimensional diffraction grating 5. For the trapping and cooling step, it is necessary to apply a quadripolar magnetic field whose magnetic field zero position is adjusted in such a way as to be located in the overlapping area 16. By way for non-limitative example, an electro-magnetic coil 65 is arranged on the rear of the two-dimensional diffraction grating 5 (FIG. 1). This coil 65 makes it possible to generate a magnetic field gradient in the vicinity of the overlapping area 16 for the trapping and cooling of the cloud of atoms. As a variant, the support of the two-dimensional diffraction grating 5 integrates magnetic field generating means suitable for the trapping and cooling of the cloud of atoms.

Advantageously, the magnetic field generating device generates a magnetic field B in the overlapping area 16 of the laser beams. By way of example, the magnetic field generating device comprises an electric generator 6 that selectively power supplies one or several pairs of electric coils in Helmholtz configuration 61, 62, 63 in such a way as to generate a magnetic field of adjustable direction. By way of non-limitative example, the magnetic field generating device comprises another electric coil 64 and/or 65 coaxial to the Z-axis, which allows generating a magnetic field gradient, for example to control the speed of the atoms in free fall along the Z-axis.

Different magnetic field configurations are necessary for the different steps. These different configurations can be obtained using coils, separated or not. For the cooling and trapping step, it is necessary to use a quadripolar field (for example, using the pair of coils 61 in anti-Helmholtz configuration) whose field zero is located in the overlapping area of the atoms. The combination of this quadripolar magnetic field and the five laser beams superposed to each other in the overlapping area 16 forms a magneto-optic trap. This magneto-optic trap is operable to trap and cool the cloud of atoms, to maintain the position of the cloud of cold atoms 19 in the overlapping area 16, the cloud of cold atoms 19 being at a temperature lower than a few Kelvins, for example of the order of 3 μK.

The optical polarization of the incident beam during the trapping is circular. The speed of the atoms is null on average (they are trapped) and the speed dispersion corresponds to the temperature. The source contains two laser frequencies offset by a few MHz to a few tens of MHz with respect to the atomic transition (in comparison to the few 100 MHz to a few GHz for the interferometry step).

For a potential magnetic acceleration step, it is necessary to use a magnetic field gradient oriented along the direction of the desired acceleration. The necessary gradient being important, the coil(s) 64 and/or 65 generating this gradient are advantageously located as close as possible to the atoms (and hence to the grating 5).

For the interferometry step, it is necessary to produce an homogeneous magnetic field whose direction must be adjustable (for example, using the 3 pairs of coils 61, 62, 63 in Helmholtz configuration).

In a typical atomic interferometer, it is possible to select independently a pair of counter-propagating laser beams to perform an interferometric measurement along a determined axis. On the contrary, the use of a two-dimensional diffraction grating 5 here generates simultaneously four laser beams diffracted along four different directions. It is not possible to generate a single pair of laser beams from the two-dimensional diffraction grating 5. The configuration of a two-dimensional diffraction grating 5 suits for the trapping of atoms but seems a priori unsuitable for performing atomic interferometry measurements along a determined axis.

The present disclosure proposes to take advantage of the fact that the resonance frequencies of the Raman transitions depend on the speed of the atoms, and that their efficiency depends on the polarization of the laser beams, the direction of the magnetic field applied and of the spin state of the atoms. More precisely, the present disclosure proposes to select a pair of beams and hence the sensitive direction of the atomic interferometer using these three control parameters.

As detailed hereinafter, to obtain an atomic interferometry measurement in relation to a determined orientation in the orthonormal coordinate system, an atomic interferometer of determined direction is selected, by controlling a combination of the three following parameters: the magnetic field direction, the optical polarization of the incident laser beam and the speed of the atoms. More precisely, the trapping and the detection are independent of the measurement direction of the atomic interferometer. The launching of the atoms can be adjusted to choose a particular direction.

The magnetic field generating device is operable to select the direction of the magnetic field applied, for example using a combination of the three pairs of electric coils 61, 62, 63 in Helmholtz configuration.

To choose the spin state of the atoms, we consider here the case of a transition between the two non-magnetic fundamental states, for example for the rubidium 87. This is the most used case because it allows first-order insensitivity to the magnetic field fluctuations.

The polarization means 4, comprising for example a liquid crystal retarder, are operable to polarize the incident laser beam 11 according to a determined polarization state.

Various techniques make it possible to control the speed of the atoms in direction and amplitude. For example, the effect of gravity may be used to let the atoms fall. As a function of the diffraction grating orientation with respect to the gravity, the atoms can fall by gravity along any axis in the coordinate system linked to the diffraction grating. For that purpose, the atomic interferometer 100 advantageously comprises orienting means suitable for allowing the orientation of the unit formed by the two-dimensional diffraction grating, the laser source and the magnetic field generating means. More precisely, these orientation means are operable to orient the axes of the two-dimensional diffraction grating with respect to the vertical axis linked to the gravity.

Another technique for controlling the speed of the atoms is based on the use of an optical grating formed by a so-called "moving molasses" technique or also a magnetic field gradient to accelerate the atoms. Finally, another technique for controlling the speed of the atoms consists in varying rapidly the optical frequencies of the laser source during the Raman pulse to simulate an artificial speed. In this case, the frequency variation combined with the time of propagation of light between the atoms and the diffraction grating lifts the degeneracy between the speed-selective Raman transitions corresponding, on the one hand, to the absorption of an incident photon of frequency $f_1$ and the emission of a photon diffracted by the grating and of frequency $f_2$, and on the other hand, to the absorption of an incident photon of frequency $f_2$ and the emission of a photon diffracted by the grating and of frequency $f_1$ (see Phys. Rev. A 100, 053618).

In the following of the present document, we consider a two-dimensional diffraction grating configured to diffract an incident laser beam orthogonal to the grating in orders +1 and −1, with an angle θ in four directions in space, as illustrated in FIGS. 2 and 3. In FIG. 3, in the XZ-plane, we observe the first diffracted beam 12 in order +1 and the second diffracted beam 13 in order −1. The diffracted beams 12, 13 form an angle θ with the Z-axis of the incident laser beam 11. Similarly to FIG. 3, in the YZ-plane, we observe the third diffracted beam 14 in order +1 and the fourth diffracted beam 15 in order −1. The diffracted beams 14, 15 also form an angle θ with the Z-axis of the incident laser beam 11. The angle θ is between 30 and 60 degrees, for example of the order of 45 degrees. The Z-axis is here vertical.

Let us note $k_Z$ the wavevector of the incident laser beam 11, $k_{+X}$ the wavevector of the first diffracted beam 12, $k_{-X}$ the wavevector of the second diffracted beam 13, $k_{+Y}$ the wavevector of the third diffracted beam 14 and $k_{-Y}$ the wavevector of the fourth diffracted beam 15, respectively. The wavevectors of the five different beams are the following in the orthonormal XYZ coordinate system:

$$|k_z = k(0,0,-1)$$

$$k_{+x} = k(\sin\theta, 0, \cos\theta)$$

$$k_{-x} = k(-\sin\theta, 0, \cos\theta)$$

$$k_{+y} = k(0, \sin\theta, \cos\theta)$$

$$k_{-y} = k(0, -\sin\theta, \cos\theta) \qquad \text{[Math. 1]}$$

From theses five laser beams, there exist 20 combinations of two laser beams or 20 possible pairs of beams, corresponding to 10 distinct directions and 2 distinct senses per direction, by difference between the wavevectors of two beams. These 10 distinct directions are three-dimensionally distributed. In the case where the grating symmetry is of order 4 (the diffraction angle is the same in the XZ- and YZ-planes), two directions are identical in the XY-plane. Let us note $\Delta k_i$ the different combinations of two beams or, more precisely, of two wavevectors of the type $k_A - k_B$. A Mach-Zehnder interferometer using a pair of beams (A, B) has a phase sensitivity of the type $\phi = \Delta k_i \, a \, T^2$, where a represents the acceleration vector of the atoms along the direction defined by the wavevector $k_A - k_B$.

Figure 4:
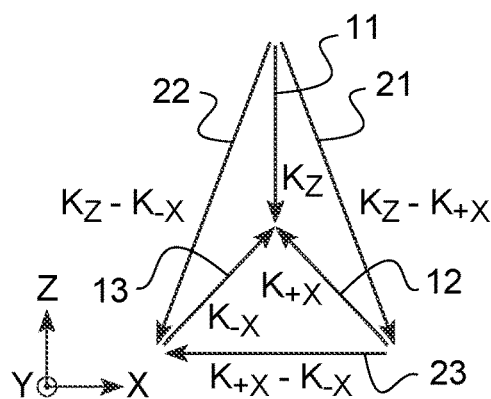
FIG. 4 is a view of possible pairs of beams in the plane of diffraction of FIG. 3, which shows some of the pairs of beams that can be used to form an atomic interferometer sensitive to an acceleration along different directions.

FIG. 4 illustrates examples of pairs of beams in the XZ-plane, from the three following beams: the incident laser beam 11, the first diffracted beam 12 and the second diffracted beam 13. We observe here three pairs of beams in the XZ-plane making it possible to form three interferometers that are acceleration-sensitive along three different directions: $k_z - k_{+X}$, $k_z - k_{-X}$ and $k_{+X} - k_{-X}$. Conventionally, for each interferometer, the symmetrical transitions based on the 2 opposite pairs: $k_A - k_B$ and $k_B - k_A$ are used to reject different measurement biases present in the atomic interferometers. Similar combinations between the incident laser beam 11, the third diffracted beam 14 and the fourth diffracted beam 15 exist in the YZ-plane. Other combinations of two beams involve a beam diffracted along the X-axis and another beam diffracted along the Y-axis.

The laser frequencies are the same for all the beams. A Raman transition is resonant for a detuning between the two frequencies comprised in the laser beam equal to $\delta = \delta_{HF} + \Delta k_i \cdot v$, where v represents the speed of the atoms at the time of the laser pulse and $\delta_{HF}$ the optical frequency detuning (which corresponds to the difference of energy) between the two fundamental states of the atom (equal to 6.8 GHz in the case of the rubidium-87 atom), v and $\Delta k_i$ being here vectors. This speed of the atoms can be estimated thanks to the knowledge of the gravity field and of the time duration between the Raman pulse and the beginning of fall of the atoms. The optical frequency detuning $\delta_{HF}$ is a constant proper to each atom. It is hence possible to use the initial speed of the atoms to select a specific Raman transition. More precisely, the optical frequency detuning δ of the laser source is controlled in such a way as to be adjusted to the speed of the atoms. This control is generally easy and rapid. The speed of the atoms is independently controllable to some extent by controlling the inclination of the two-dimensional diffraction grating with respect to the gravity field, or using the moving molasses or the magnetic field gradients techniques.

Figure 5:
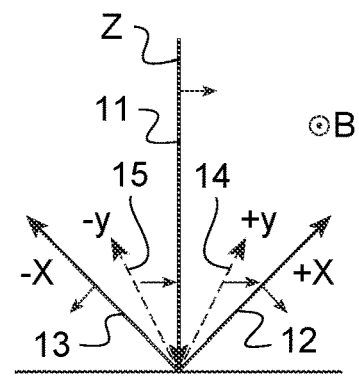
FIG. 5 is a view of an example of a combination of a magnetic field with an optical polarization state of the incident laser beam and the diffracted beams.

Let us consider now the rubidium-87 atom in a particular optical polarization and magnetic field configuration illustrated in FIG. 5. The incident laser beam 11 is linearly polarized along the X-axis. The two-dimensional diffraction grating is designed to maintain the polarization state of light. Hence, the diffracted beams 12, 13, 14, 15 are also linearly polarized in the XZ-plane. FIG. 5 shows the resulting polarizations according to the different diffracted beams in the XZ-plane. The diffracted beams 14, 15 are represented in perspective (they are in the YZ-plane), however, the polarization of these diffracted beams 14, 15 is effectively oriented along the X-axis. The electric generator 6 selectively power supplies the pair of electric coils 63 is such a way as to generate a magnetic field B oriented along the Y-axis. In other words, the magnetic field B is here oriented orthogonally to the polarization of the incident laser beam 11. In this example, the polarization states of the different beams can be represented in a basis $(\sigma_-, \pi, \sigma_+)$ with respect to the axis of quantification defined by the direction of the magnetic field, where $\pi$ represents a polarization state (or an electric field E) aligned along the axis of the magnetic field B, $\sigma_-$ a left circular polarization state and $\sigma_+$ a right circular polarization state:

$\varepsilon_z(1,0,1)/\sqrt{2}$ $\varepsilon_{+x}=(1,0,e^{2i\theta})/\sqrt{2}$ $\varepsilon_{-x}=(1,0,e^{-2i\theta})/\sqrt{2}$ $\varepsilon_{+y}=(1,0,1)/\sqrt{2}$ $\varepsilon_{-y}=(1,0,1)/\sqrt{2}$ [Math. 2]

Now, only certain transitions are permitted by atomic physics. In particular, the two-photon transitions involving beams of identical linear polarization and an accurate choice of the spin state of the atoms are inhibited by quantum interference effects. It follows that this configuration makes it possible to eliminate the transitions of the (Y, Z) and (Y, Y) type, i.e. the transitions in the YZ-plane between the wavevectors $k_Z$, $k_{+Y}$ and $k_{-Y}$. Consequently, the selection of a combination of a magnetic field B oriented along the Y-axis and a linear polarization state along the X-axis allows selecting only the transitions of the (X, Z) and (X, X) type in the XZ-plane between the wavevectors $k_Z$, $k_{+X}$ and $k_{-X}$ as well as the transitions of the (XY) type in the XY-plane between the wavevectors $k_{+X}$ (or $k_{-X}$) and $k_{+Y}$ (or $k_{-Y}$).

Among the pairs of beams selected by combination of the polarization state and the magnetic field, we desire to select only one pair of beams to determine an axis of interferometer measurement.

A method for selecting a single pair of beams is based on the calculation of the coupling force for each pair of beams (among the 20 possible pairs) and each atomic speed between the initial quantum state denoted $|1, v_0\rangle$ and the states excited by the different Raman transitions denoted $|2, v_0+\hbar \Delta k_i/m\rangle$, where h represents the Planck constant divided by 2 pi and m the mass of the considered atom. This calculation involves the couplings between the two fundamental levels and the whole excited states of the atom and the detuning at the Raman resonance that involves the speed of the atoms. The interaction of the atoms with the light of the different beams can be described in the sub-set of the initial and Raman-transition excited levels by a Hamiltonian of size 21×21 (according to the so-called rotating-wave approximation, for the 20 combinations in addition to the initial state), as indicated hereinafter.

$$H = \begin{pmatrix} 0 & \hbar\Omega_1/2 & \ldots & \hbar\Omega_N/2 \\ \hbar\Omega_1/2 & \hbar\delta_1 & 0 & 0 \\ \vdots & 0 & \ddots & \vdots \\ \hbar\Omega_N/2 & 0 & \ldots & \hbar\delta_N \end{pmatrix}$$ [Math. 3]

where $\Omega_i$ represents the on-resonance Rabi frequency of the transition i and $\delta_i$ the two-photon detuning, which depends on the speed of the atoms. The quantum state after a duration of interaction t with light is then simply expressed by: $|\phi(t)\rangle = \exp(-iHt/h)|1, \Delta v_0\rangle$.

Figure 6:
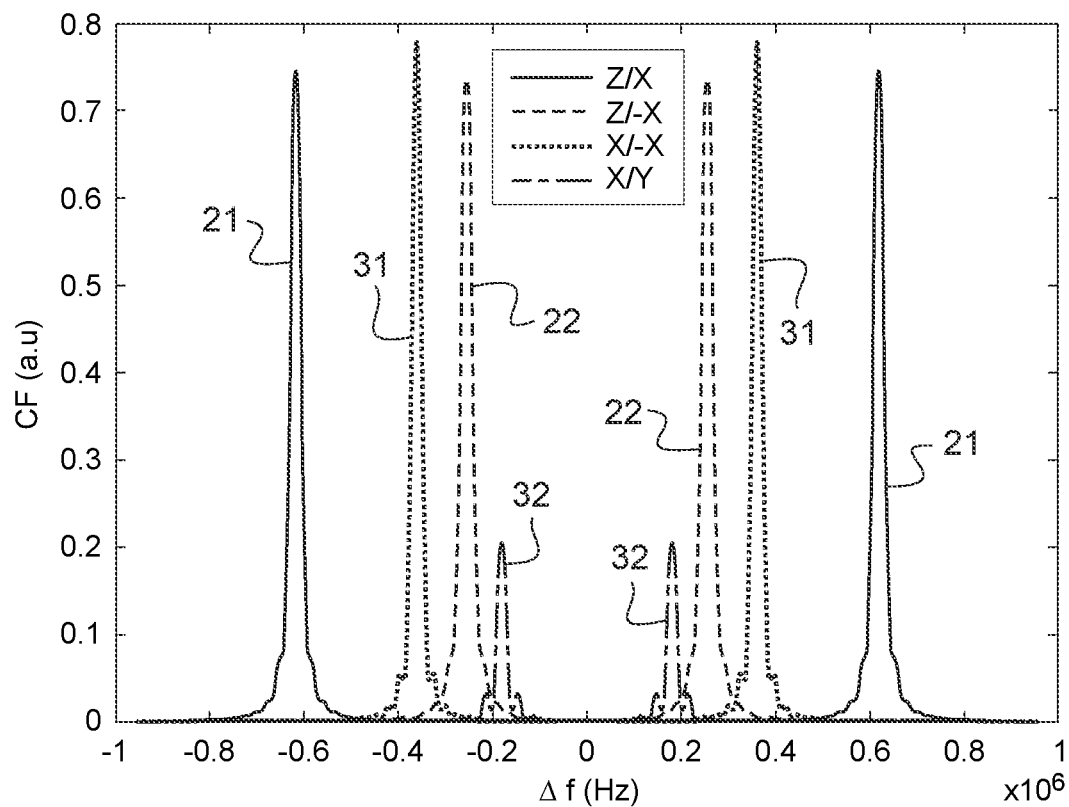
FIG. 6 represents the coupling force for different two-photon Raman transitions as a function of the frequency detuning between two lines of the laser source.

FIG. 6 shows the coupling forces (CF) of the allowed transitions between the different states after a time of interaction $t_\pi = \pi/\Omega_{XZ}$ as a function of the detuning between the two frequencies of the laser for the allowed transitions on the basis of the magnetic field applied and of the polarization of the beams (the other transitions having a zero excitation probability). The intensity of the incident laser beam is here of 60 W/m² and the temperature of the atoms is low enough not to produce a Doppler widening. By way of example, the initial speed is directed diagonally with respect to the directions X and Z: $v_0=(0.2, 0, 0.2)$ m/s in the XYZ coordinate system. This choice corresponds to the case of an initial free fall launching of the atoms with the diffraction grating inclined by 45 degrees with respect to the gravity. It is observed in FIG. 6 that the different Raman transitions are separated in frequency by Doppler effect. The beam combination $k_X$-$k_{+X}$ corresponds to a frequency detuning of about ±0.625 MHz at peaks 21, the beam combination $k_Z$-$k_{-X}$ corresponds to a frequency detuning of about ±0.25 MHz at peaks 22, the beam combination $k_{+X}$-$k_{-X}$ corresponds to a frequency detuning of about ±0.36 MHz at peaks 31, the beam combination $k_{+X}$-$k_{+Y}$ corresponds to a frequency detuning of about ±0.18 MHz at peaks 32. In particular, it is possible to isolate the transitions of the (+X, Z), (+X, −X) and (−X, Z) type by selecting the frequency detuning of the source in combination with the orientation and amplitude of the initial speed. This configuration makes it possible to separate the atomic interferometers sensitive to the axes defined by the XZ, −XZ and XX transitions. Indeed, the (Y, Z) and (Y, Y) transitions are eliminated by the choice of the polarization and the field B. It is observed that the transitions 32 and 22 are close to each other. If however a coupling is observed between the transitions 32 and 22, it is possible to increase the initial speed so as to further separate them. A transition having a high intensity is selected to activate a specific resonance of the atoms. The other transitions have a off-resonance frequency or a relatively low intensity that makes them inefficient to activate a two-photon Raman transition. Two transitions among the XZ, −XZ and XX transitions form a two-dimensional non-orthogonal basis.

Similarly, the atomic interferometers having a sensitivity along the Y-axis can be obtained by changing simultaneously the combination of the polarization of the incident beam along the Y-axis, the direction of the magnetic field along the X-axis and the frequency detuning of the laser source. A three-dimensional non-orthogonal basis is hence obtained, so that atomic interferometry measurements can be obtained along three axes of this 3D basis. This 3D basis is determined by the orientation and the configuration of the two-dimensional diffraction grating.

By sequential selection of different combinations of magnetic field, beam polarization and frequency detuning between the two laser source lines, it is hence possible to sequentially perform several Mach-Zehnder atomic interferometers that are acceleration-sensitive along at least three distinct axes in order to reconstruct the three components of the acceleration vector in the orthonormal XYZ coordinate system.

As a variant, it is possible to adjust the speed of the atoms instead of the frequency detuning between the two laser source lines or, as a complement, to adjust the speed of the atoms and the frequency detuning between the two laser source lines. However, in practice, it is simpler to adjust only the frequency detuning between the two laser source lines, the speed of the atoms being determined.

The detection system 8 detects, for example by fluorescence, a signal representative of the quantum state of the atoms after recombination of the two clouds of atoms at the exit of a Mach-Zehnder atomic interferometer. The calculator 9 includes a signal processing system that calculates the acceleration of the atoms along the chosen axis based on the signal provided by the detection system 8. According to various variants, the detection system 8 can be arranged inside or outside the vacuum chamber 7.

The controller 20 then switches the magnetic field orientation, the incident laser beam polarization state and the detuning between the two laser source frequencies to perform a second atomic interferometry measurement along a second predetermined measurement axis. Then, the controller 20 switches again the magnetic field orientation, the incident laser beam polarization state and the detuning between the two laser source frequencies to perform a third atomic interferometry measurement along a third predetermined measurement axis. We hence obtain sequentially, within less than 100 ns per measurement axis, the three components of the acceleration vector of the atoms from a single source of atoms and a single laser source.

The user interface 40 makes it possible, for example, to record the selected direction(s) of atomic interferometry measurement and the order in which sequential measurements are performed along different measurement axes.

We have described an embodiment based on the use of a two-dimensional diffraction grating that diffracts an incident beam to form four diffracted beams in two transverse planes. This embodiment generates 20 pairs of beams that make it possible to perform sequential measurements by Mach-Zehnder atomic interferometry along three axes of a basis, from a single laser source and a single source of atoms.

As a variant, a two-dimensional diffraction grating consisted for example of three linear gratings is used, which makes it possible to diffract an incident beam into three respectively diffracted beams, for example in order +1 of each linear grating, the three diffracted beams being inclined by an angle θ with respect to the incident beam. This embodiment generates 12 pairs of beams from the incident beam and the three diffracted beams. Similarly to the four diffracted beam embodiment, a combination of magnetic field, optical polarization of the beams, frequency detuning related to the speed of the atoms is used to select a pair of beams, i.e. a wavevector difference determining a measurement axis adapted to produce an efficient interaction by multi-photon transition with the atoms. This combination is easily switchable to apply the selection to another pair of beams, i.e. another wavevector, in other words another measurement axis, to allow performing sequential measurements by Mach-Zehnder atomic interferometry along three axes of a basis, from a single laser source and a single source of atoms.

Figure 7:
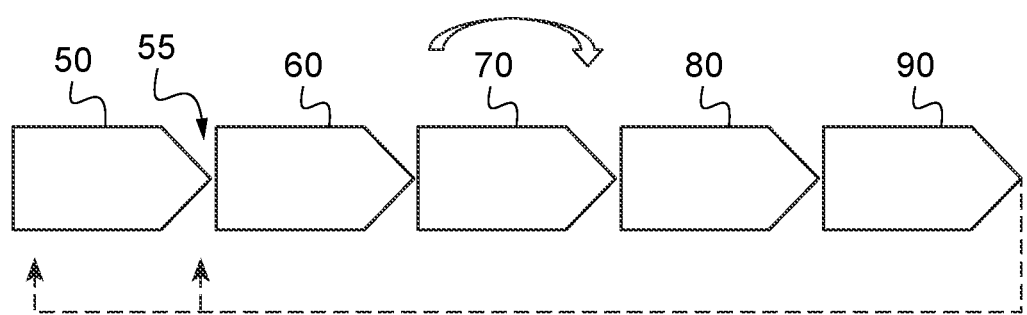
FIG. 7 is a schematic representation of an experimental sequence of atomic interferometry measurement according to an exemplary embodiment of the invention.

FIG. 7 schematically shows an experimental sequence of measurement by atomic interferometry according to an exemplary embodiment of the invention.

Step 50 is a step of trapping and cooling the atoms and preparing the initial quantum state of the atoms. During this step 50, the source of atoms 1 generates a cloud of atoms that is transferred to the vacuum chamber 7. The laser source 2 generates an incident laser beam 11 along the Z-axis, towards the two-dimensional diffraction grating 5 that generates four diffracted beams 12, 13, 14, 15 spatially superposed with the incident laser beam 11. To trap and cool the atoms by magneto-optic trapping, a quadripolar magnetic field is applied, whose field zero is located in the overlapping area of the beams. During this step 50, the polarization means 4 are configured in such a manner that the polarization state of the incident laser beam 11 is circular. Moreover, the system 3 for adjusting the optical frequency detuning between two lines of the laser source is configured to generate two frequencies detuned by a few MHz to a few tens of MHz with respect to the atomic transitions transferring the atoms from each of the two fundamental states to the excited state. This combination of the parameters relating to the polarization state of the incident laser beam, the magnetic field and the frequency detuning of the double-frequency source makes it possible to trap the atoms to form a cloud of cold atoms 19 in the overlapping area 16 in the vicinity of the two-dimensional diffraction grating 5 and/or to prepare their initial quantum state. The cold atoms 19 are in the initial quantum state $|1, v_0\rangle$, where $v_0$ represents the initial speed vector of the atoms. The duration of step 50 of trapping and cooling atoms and preparing the initial quantum state is between 10 ms and 1 s.

At step 55, a direction of atomic interferometry measurement is selected among the 20 possible pairs of beams, for example the direction corresponding to the wavevector $k_Z - k_{-X}$.

For that purpose, at step 60, the controller 20 configures the magnetic field generating device, by activating the pairs of electric coils, to generate a magnetic field oriented along a selected direction, for example the Y direction. Moreover, the controller 20 adapts the configuration of the polarization means 4 to polarize the incident beam 11 along a linear polarization state oriented along the X-axis. The duration of step 60 of orientating the magnetic field and selecting the polarization state is of the order of 1 ms.

At step 70, the cold atoms 19 are for example let in free fall, by interrupting the magneto-optic trapping. The atoms fall in a direction that depends on the acceleration and/or the gravity to which they are subjected and also on their initial speed $v_0$. The direction and amplitude of the free fall with respect to the diffraction grating can be evaluated by means of conventional accelerometers attached to the reference system of the diffraction grating and using the acceleration measurements to integrate the movement equations. By way of example, we consider here cold atoms 19 that fall along a direction located in the XZ-plane with an initial speed $v_0$ oriented to 45 degrees from the Z-axis. The duration of the free fall step 70 is of the order of 10 ms. During the free fall of the atoms, the calculator calculates in real time the speed of the atoms. The calculator combines the calculated speed of the atoms with the chosen measurement axis to calculate the Raman (or Bragg) frequency detuning applied to the laser source that is adapted to select a pair of laser beams in combination with the parameters of magnetic field orientation and of polarization state adjusted at the previous step 60. For that purpose, the system 3 for adjusting the optical frequency detuning between two lines of the laser source is adapted in such a way as to adjust the optical frequency detuning as a function of the real time calculation of the speed of the atoms. The combination of the parameters of magnetic field orientation, determined polarization state of the incident laser beam and of the diffracted beams, and of predetermined optical frequency detuning of the laser source makes it possible to select a pair of laser beams $(k_A, k_B)$ that determines an acceleration measurement axis according to the vector $k_A - k_B$. This pair of beams activates efficiently a two-photon Raman transition determined as a function of the frequency detuning related to the speed of the atoms. The pair of laser beams $(k_A, k_B)$ selected at steps 60 and 70 is hence adapted to perform an atomic interferometry measurement along the axis chosen at step 55.

As a variant, the atoms are imparted with an initial speed, for example by interaction with another laser beam, with a magnetic field gradient or using an optical grating to accelerate the atoms (moving molasses technique). According to another variant, the speed of the atoms is controlled by varying rapidly the optical frequencies of the laser source during the Raman pulse to simulate an artificial speed.

Step 80 is the step of interrogation by the Mach-Zehnder atomic interferometry selected at steps 55, 60 and 70. Conventionally, this step 80 is itself consisted of at least three steps: a first step of splitting the cloud of cold atoms 19 into two clouds of atoms propagating in two different directions, a second step of redirecting the two clouds of atoms and a last step of recombining the two clouds of atoms. The first step is carried out by applying here a first resonant pulse for a pair of laser beams ($k_A$, $k_B$). The second step is carried out by applying a second pulse consisted of the same pair of laser beams ($k_A$, $k_B$). The last step is carried out by applying a last pulse consisted of the same pair of laser beams ($k_A$, $k_B$). The duration of step 80 of measurement by Mach-Zehnder atomic interferometry is of the order of 20 ms.

Step 90 corresponds to the detection of signal at the exit of the atomic interferometer generated at step 80. For that purpose, the detection system 8 detects a signal representative of the quantum state of the atoms after recombination of the two clouds of atoms at the exit of the Mach-Zehnder atomic interferometer. The calculator 9 deduces therefrom the acceleration of the atoms along the first chosen axis.

Advantageously, from the same source of atoms and the same laser source, the method comprises a second sequence of measurement in which step 55 is reiterated to select a second axis of atomic interferometry measurement (after having repeated the step 50 of cooling and preparation of the initial quantum state). Then, in a new step 60, the direction of the magnetic field applied and the incident laser beam polarization state as a function of the second chosen measurement axis are changed. In a new step 70, the atoms are let in free fall, and a second frequency detuning of the laser source is recalculated in real time, which is adapted as a function of the second chosen measurement direction, in combination with the selected magnetic field orientation and polarization state. In a new step 80, a second Mach-Zehnder atomic interferometer is generated, which is sensitive along the second chosen axis. Finally, a new step 90 makes it possible to measure a signal representative of a second quantum state of the atoms. The calculator 9 deduces therefrom the acceleration of the atoms along the second chosen axis.

Similarly, the method is repeated to obtain a third measurement of acceleration along a third chosen axis by selecting a third combination comprising a third direction of the magnetic field, a third polarization state and a third frequency detuning of the laser source related to the speed of the atoms.

Such a Mach-Zehnder atomic interferometer finds applications in particular in a gravimeter and/or accelerometer for acceleration measurements. The in-board acceleration or rotation sensors form sensors of acceleration/relative rotation rate between the reference system to which they are attached and an inertial/Galilean reference system.

The invention finds applications in inertial navigation, accelerometry, geology, gravimetry, gradiometry, geodesy, seismology or fundamental physics.

Of course, various other modifications can be made to the invention within the framework of the appended claims.

The invention claimed is:

1. An atomic interferometer (100) comprising a source of atoms (1) adapted to generate a cloud of atoms, a laser source (2) configured to generate a source laser beam (10), a magnetic field generating device (6, 61, 62, 63), the atomic interferometer (100) further comprising polarization means (4) configured to receive the source laser beam (10) and to generate an incident laser beam (11) polarized according to an adjustable polarization state, a system (3) for adjusting a detuning between two optical frequencies of the incident laser beam, a two-dimensional diffraction grating (5) arranged in such a way as to receive the incident laser beam (11) and to form by diffraction at least three beams (12, 13, 14, 15) diffracted along at least three non-coplanar directions, the at least three diffracted beams being inclined with respect to the axis of the incident laser beam, a controller (20) configured to select a first combination of a first optical frequency detuning of the incident laser beam related to a first speed of the cloud of atoms, a first polarization state of the incident laser beam and a first magnetic field oriented along a determined direction with respect to the two-dimensional diffraction grating, the first combination being adapted to select a first pair of laser beams among the pairs of beams formed from the incident laser beam and the at least three diffracted beams, a difference between two wavevectors of the first pair of laser beams determining a first measurement direction, the first pair of laser beams being applied in such a way as to interact with the cloud of atoms according to a time sequence by multi-photon transitions and to form a first Mach-Zehnder atomic interferometer sensitive to an acceleration of the cloud of atoms along the first measurement direction.

2. The atomic interferometer (100) according to claim 1, wherein the controller (20) is configured to select a second combination of a second optical frequency detuning of the incident laser beam related to a second speed of the cloud of atoms, a second polarization state of the incident laser beam and a second magnetic field with respect to the two-dimensional diffraction grating, the second combination being adapted to select a second pair of laser beams among the pairs of beams formed from the incident laser beam and the at least three diffracted beams, a difference between two wavevectors of the second pair of laser beams determining a second measurement direction different from the first measurement direction, the second pair of laser beams being applied in such a way as to interact with the cloud of atoms according to a time sequence by multi-photon transitions and to form a second Mach-Zehnder atomic interferometer sensitive to an acceleration of the cloud of atoms along the second measurement direction.

3. The atomic interferometer (100) according to claim 1, wherein the two-dimensional diffraction grating (5) is a diffraction grating configured to generate by diffraction four diffracted beams in four non-coplanar directions.

4. The atomic interferometer (100) according to claim 1, wherein the two-dimensional diffraction grating (5) is a diffraction grating configured to generate by diffraction three diffracted beams in three non-coplanar directions.

5. The atomic interferometer (100) according to claim 1, wherein the two-dimensional diffraction grating (5) is of the polarization-maintaining type.

6. The atomic interferometer (100) according to claim 1, wherein the polarization means (4) comprise a liquid crystal retarder, a Pockels cell or a polarization controller based on the deformation of a single-mode optical fibre.

7. The atomic interferometer (100) according to claim 1, wherein the magnetic field generating device includes three pairs of electric coils (61, 62, 63) in Helmholtz configuration.

8. The atomic interferometer (100) according to claim 1, comprising magnetic field gradient generating means (64, 65) adapted to adjust the first speed of the cloud of atoms.

9. The atomic interferometer (100) according to claim 1, wherein the system (3) for adjusting a detuning between two optical frequencies of the incident laser beam is adapted to adjust the first optical frequency detuning as a function of the first speed of the cloud of atoms.

10. The atomic interferometer (100) according to claim 1, wherein the system (3) for adjusting a detuning between two optical frequencies of the incident laser beam comprises an electro-optic modulator and a radiofrequency source.

11. The atomic interferometer according to claim 2, wherein the two-dimensional diffraction grating is a diffraction grating configured to generate by diffraction four diffracted beams in four non-coplanar directions.

12. The atomic interferometer according to claim 2, wherein the two-dimensional diffraction grating is a diffraction grating configured to generate by diffraction three diffracted beams in three non-coplanar directions.

13. The atomic interferometer according to claim 2, wherein the two-dimensional diffraction grating (5) is of the polarization-maintaining type.

14. The atomic interferometer according to claim 2, comprising magnetic field gradient generating means adapted to adjust the second speed of the cloud of atoms.

15. The atomic interferometer according to claim 2, wherein the system for adjusting a detuning between two optical frequencies of the incident laser beam is adapted to adjust the second optical frequency detuning as a function of the second speed of the cloud of atoms.

16. An atomic interferometry method comprising the following steps:
   a) generating a cloud of atoms;
   b) selecting a first polarization state of a laser beam incident on a two-dimensional diffraction grating and a first magnetic field oriented along a determined direction with respect to the two-dimensional diffraction grating;
   c) launching (70) the cloud of atoms with a first speed and calculating a first detuning between two optical frequencies of the incident laser beam, the first optical frequency detuning being related to the first speed, to form a first combination of the first optical frequency detuning of the incident laser beam, the first polarization state of the incident laser beam and the first magnetic field, the first combination being adapted to select a first pair of beams among the pairs of beams formed from the incident laser beam and at least three diffracted beams formed by diffraction of the incident laser beam on the two-dimensional diffraction grating along at least three non-coplanar directions;
   d) applying to the cloud of atoms the first combination of the first magnetic field, the first polarization state and the first detuning between two optical frequencies of the incident laser beam, in such a way as to select the first pair of laser beams, a difference between wavevectors of the first pair of laser beams determining a first measurement direction, the first pair of laser beams being applied in such a way as to interact with the cloud of atoms according to a time sequence of multi-photon transitions and to form a first Mach-Zehnder atomic interferometer sensitive to an acceleration of the cloud of atoms along the first measurement direction;
   e) detecting (90) a signal representative of an acceleration of the cloud of atoms along the first measurement direction.

17. The atomic interferometry method according to claim 16, wherein step a) is repeated, and further comprising the following steps:
   f) selecting a second magnetic field and a second polarization state of the laser beam incident on the two-dimensional diffraction grating;
   g) launching (70) the cloud of atoms with a second speed and calculating a second detuning between two optical frequencies of the incident laser beam, the second optical frequency detuning being related to the second speed, to form a second combination of the second optical frequency detuning of the incident laser beam, the second polarization state of the incident laser beam and the second magnetic field, the second combination being adapted to select a second pair of beams among the pairs of beams formed from the incident laser beam and the at least three diffracted beams;
   h) applying to the cloud of atoms the second combination of the second magnetic field, the second polarization state and the second detuning between two optical frequencies of the incident laser beam, in such a way as to select the second pair of laser beams, a difference between wavevectors of the second pair of laser beams determining a second measurement direction, the second pair of laser beams being applied in such a way as to interact with the cloud of atoms according to a time sequence of multi-photon transitions and to form a second Mach-Zehnder atomic interferometer sensitive to an acceleration of the cloud of atoms along the second measurement direction;
   i) detecting (90) a signal representative of an acceleration of the cloud of atoms along the second measurement direction.

18. The atomic interferometry method according to claim 16, comprising a step of trapping and cooling the cloud of atoms to form a cloud of cold atoms (19) and preparing an initial quantum state of the cloud of cold atoms (19).

19. The atomic interferometry method according to claim 18, wherein the trapping and cooling step comprises a magneto-optic trapping of the cloud of atoms by superposition of the incident laser beam (11) and the at least three diffracted beams (12, 13, 14, 15) in an overlapping area (16) and by application of a quadripolar magnetic field adapted to form the cloud of cold atoms (19).

* * * * *